United States Patent [19]
Goodrum

[11] Patent Number: 5,922,060
[45] Date of Patent: Jul. 13, 1999

[54] EXPANSION CARD INSERTION AND REMOVAL

[75] Inventor: Alan L. Goodrum, Tomball, Tex.

[73] Assignee: Compaq Computer Corporation, Houston, Tex.

[21] Appl. No.: 08/775,133

[22] Filed: Dec. 31, 1996

[51] Int. Cl.[6] .................................................. G06F 13/00
[52] U.S. Cl. ............................................................ 710/103
[58] Field of Search .................................. 397/282, 283, 397/293–305

[56] References Cited

U.S. PATENT DOCUMENTS

| | | | |
|---|---|---|---|
| 3,767,974 | 10/1973 | Donovan, Jr. et al. | 317/101 |
| 3,853,379 | 12/1974 | Goodman et al. | 339/75 |
| 4,079,440 | 3/1978 | Ohnuma et al. | 361/424 |
| 4,559,456 | 12/1985 | Yamamoto et al. | 307/66 |
| 4,596,907 | 6/1986 | LaGreco et al. | 200/50 |
| 4,628,413 | 12/1986 | Speraw | 361/415 |
| 4,835,737 | 5/1989 | Herrig et al. | 364/900 |
| 4,875,867 | 10/1989 | Hoo | 439/157 |
| 4,999,787 | 3/1991 | McNally et al. | 364/514 |
| 5,003,431 | 3/1991 | Imsdahl | 361/415 |
| 5,010,426 | 4/1991 | Krenz | 360/97.01 |
| 5,191,970 | 3/1993 | Brockway et al. | 200/335 |
| 5,247,619 | 9/1993 | Mutoh et al. | 395/325 |
| 5,309,031 | 5/1994 | Stewart et al. | 307/66 |
| 5,310,998 | 5/1994 | Okuno | 235/380 |
| 5,317,482 | 5/1994 | Bujtas | 361/798 |
| 5,317,483 | 5/1994 | Swindler | 361/801 |
| 5,386,567 | 1/1995 | Lien et al. | 395/653 |
| 5,428,507 | 6/1995 | Chatel et al. | 361/798 |
| 5,454,080 | 9/1995 | Fasig et al. | 395/283 |
| 5,473,499 | 12/1995 | Weir | 361/58 |
| 5,504,656 | 4/1996 | Joist | 361/754 |
| 5,513,329 | 4/1996 | Pecone | 395/281 |
| 5,530,302 | 6/1996 | Hamre et al. | 307/147 |
| 5,555,510 | 9/1996 | Verseput et al. | 364/514 |
| 5,581,712 | 12/1996 | Herrman | 395/283 |
| 5,617,081 | 4/1997 | Madnick et al. | 340/825.03 |
| 5,625,238 | 4/1997 | Ady et al. | 307/147 |
| 5,629,836 | 5/1997 | Wright | 361/755 |
| 5,680,288 | 10/1997 | Carey et al. | 361/118 |

FOREIGN PATENT DOCUMENTS

| | | |
|---|---|---|
| 0 241 905 | 10/1987 | European Pat. Off. . |
| 0 254 456 | 1/1988 | European Pat. Off. . |
| 28 50 440 | 5/1979 | Germany . |
| 34 09 021 | 9/1985 | Germany . |
| WO 93/15459 | 8/1993 | WIPO . |

OTHER PUBLICATIONS

Maintenance & Service Guide, Compaq Deskpro XL Series of Personal Computers; pp. 3–18, 5–34; Compaq Computer Corp., Houston, Tx.; Dec. 15, 1995.

Hot Plug Receptacle Actuated Mechanical Latch, IBM Technical Disclosure Bulletin, vol. 34, No. 6, Nov. 1991, pp. 363–364.

Don Anderson, *PCMCIA System Architecture*, PC System Architecture Series, Second Edition, pp. 21–83, 113–141, 145–162, 229–309, 321–332, Copyright © 1995, by Mind-Shar, Inc., Richardson, TX.

Don Anderson/Tom Shanley, *CardBus System Architecture*, PC System Architecture Series, pp. 17–29, 39–58, 227–236, 321–361, Copyright © 1996 by MindShare, Inc., Richardson, TX.

CompactPCI™ Specfication, PCI Industrial Computers, Revision 10, Nov. 1, 1995, pp. 14, 36 and 50.

*Primary Examiner*—Glenn A. Auve
*Assistant Examiner*—Paul R. Myers
*Attorney, Agent, or Firm*—Sharp, Comfort & Merrett, P.C.

[57] ABSTRACT

The invention features a circuit card for use with a computer system having a card slot electrically connected to a bus. The card slot has electrical contacts corresponding to lines of the bus. The circuit card has a first pin positioned to extend into the card slot when the card is inserted into the slot and contact a first electrical contact of the slot corresponding to a communication line of the bus. The circuit card also has a second pin positioned to extend into the card slot when the card is inserted into the slot and contact a second electrical contact of the slot corresponding to a clock line of the bus before the first pin contacts the first electrical contact.

9 Claims, 11 Drawing Sheets

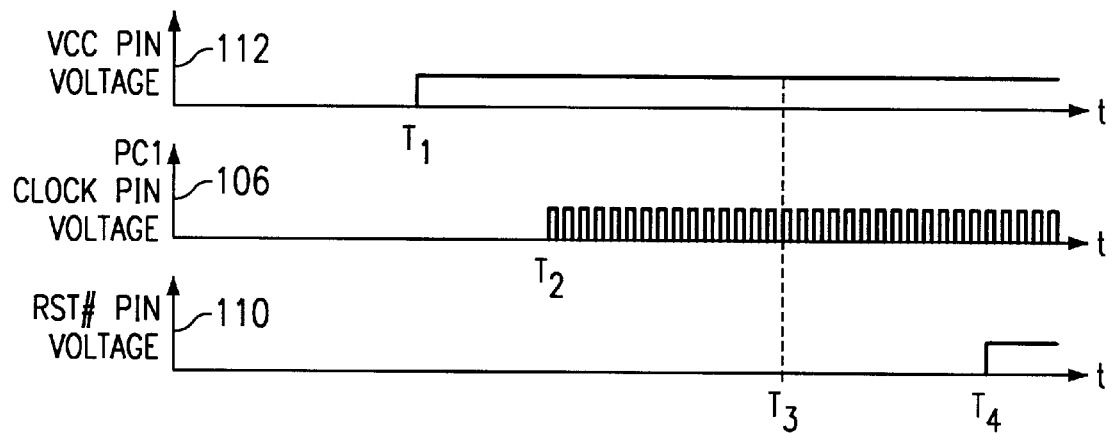
*FIG. 6*  REMAINING PCI BUS SIGNALS CONNECTED →
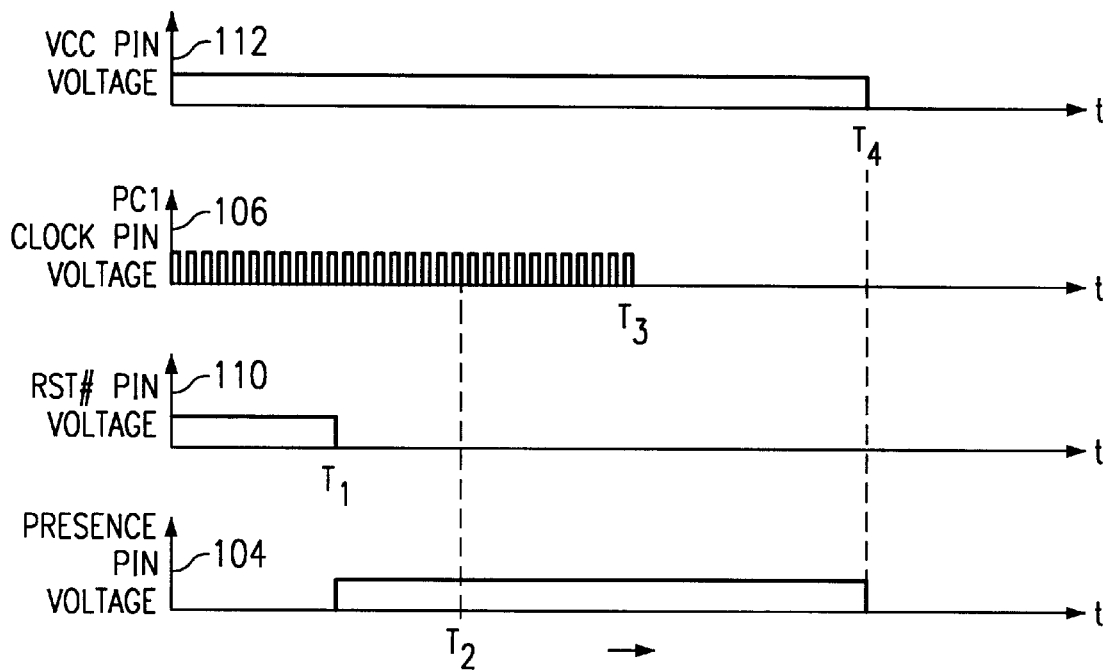
*FIG. 7*  SIGNAL LINES DISCONNECTED →

EXPANSION CARD INSERTION AND REMOVAL

BACKGROUND

The invention relates to inserting and removing expansion cards.

Computer systems typically have expansion card slots for receiving and electrically coupling expansion cards to an expansion bus of the computer system. The expansion bus may be one of several types, such as an Industry Standard Architecture (ISA) bus, an Extended Industry Standard Architecture (EISA) bus, or a Peripheral Component Interconnect (PCI) bus.

SUMMARY

In general, in one aspect, the invention features a circuit card for use with a computer system having a card slot electrically connected to a bus. The card slot has electrical contacts corresponding to lines of the bus. The circuit card includes a first pin positioned to extend into the card slot when the card is inserted into the slot and contact a first electrical contact of the slot corresponding to a communication line of the bus. The circuit card also has a second pin positioned to extend into the card slot when the card is inserted into the slot and contact a second electrical contact of the slot corresponding to a clock line of the bus before the first pin contacts the first electrical contact.

Implementations of the invention may include one or more of the following. The circuit card may have a third pin positioned to extend into the card slot when the card is inserted into the slot and contact a third electrical contact of the slot corresponding to a power supply line before the first pin contacts the first electrical contact. The position of the third pin may allow the third pin to contact the third electrical contact before the second pin contacts the second electrical contact when the card is inserted into the slot. The position of the third pin may permit the third pin and the second pin to concurrently contact the second and third pins when the card is inserted into the slot. The circuit card may have a third pin positioned to extend into the card slot when the card is inserted into the slot and contact a third electrical contact of the slot used to indicate presence of the circuit card in the slot. This third pin may contact the third electrical contact before the first and second pin contacts the first and second electrical contacts when the card is inserted into the slot. The first pin may be shorter than the second pin.

In general, in another aspect, the invention features a computer system having a bus, a card slot connected to the bus, and an arbiter. The arbiter is configured to receive requests for access to the bus and selectively grant access to the bus. The computer system also has a circuit connected to the card slot and configured to interact with the arbiter to request access for the bus when a card is inserted into the slot.

Implementations of the invention may include one or more of the following. The computer system may have a central processing unit and another circuit connected to the card slot configured to detect insertion of a card into the card slot and provide an indication to the central processing unit when the card is inserted into the slot. The circuit configured to interact with the arbiter may hold access to the bus when granted by the arbiter until the card is fully inserted into the slot.

In general, in another aspect, the invention features a computer system having a bus, a card slot connected to the bus, and an arbiter. The arbiter is configured to receive requests for access to the bus and selectively grant access to the bus. The computer system also has a circuit connected to the card slot and configured to interact with the arbiter to request access for the bus when the card is removed from the slot.

Implementations of the invention may include one or more of the following. The computer system may have a central processing unit and another circuit connected to the card slot configured to detect removal of a card from the card slot and provide an indication to the central processing unit when the card is removed from the slot. The circuit configured to interact with the arbiter may hold access to the bus when granted by the arbiter until the card is fully removed from the slot.

In general, in another aspect, the invention features a computer system having a central processing unit, a bus, a card slot connected to the bus, and a circuit. The circuit is connected to the card slot and configured to provide an indication to the central processing unit when the card is inserted into the slot.

In general, in another aspect, the invention features a computer system having a central processing unit, a bus, a card slot connected to the bus, and a circuit. The circuit is connected to the card slot and configured to provide an indication to the central processing unit when the card is removed from the slot.

In general, in another aspect, the invention features a method for use in a computer system having a bus and a card slot connected to the bus. The method includes detecting insertion of the card into the slot and arbitrating for control of the bus when insertion is detected.

In general, in another aspect, the invention features a method for use in a computer system having a bus and a card slot connected to the bus. The method includes detecting removal of the card from the slot and arbitrating for control of the bus when removal is detected.

In general, in another aspect, the invention features a method for use in a computer system having a card slot connected to the bus. The method includes detecting partial insertion of a card into the card slot and holding the card in reset between a time when the card is partially inserted into the card slot and a time when the card is more fully inserted into the card slot.

Implementation of the invention may include the computer system having a central processing unit, and the method may include indicating to the central processing unit when the card has been inserted into the slot.

In general, in another aspect, the invention features a method for use in a computer system having a card slot connected to a bus. The method includes detecting removal of a card from the card slot and holding the card in reset between a time when the card is partially removed from the card slot and a time when the card is more fully removed from the card slot.

Implementation of the invention may include the computer system having a central processing unit, and the method may further include indicating to the central processing unit when the card has been removed from the slot.

In general, in another aspect, the invention features a method for use in a computer system having a card slot connected to a bus and a central processing unit. The method includes detecting removal of the card from the slot and indicating to the central processing unit when the card has been removed from the slot.

In general, in another aspect, the invention features a method for use in a computer system having a card slot connected to a bus and a central processing unit. The method includes detecting insertion of the card into the slot and indicating to the central processing unit when the card has been inserted into the slot.

In general, in another aspect, the invention features a computer system having a bus having lines for communication and having a clock line; a central processing unit capable of accessing the bus; and a card slot electrically connected to the bus. The card slot has electrical contacts corresponding to the lines of the bus. The computer system also has a circuit card inserted into the slot having a first pin positioned to extend into the card slot when the card is inserted into the slot and contact a first electrical contact of the slot corresponding to one of the communication lines of the bus. The computer system also has a second pin positioned to extend into the card slot when the card is inserted into the slot and contact a second electrical contact of the slot corresponding to the clock line of the bus before the first pin contacts the first electrical contact.

In general, in another aspect, the invention features a circuit card for use with a bus having communication lines. The circuit card includes a communication pin for electrically connecting to one of the communication lines of the bus and a clock pin being longer than the communication pin.

In general, in another aspect, the invention features a computer system having a central processing unit and a bus having communication lines. The computer system also has a circuit card including a communication pin for electrically connecting to one of the communication lines of the bus and a clock pin being longer than the communication pin.

Among the advantages of the invention are one or more of the following. Operations on a card inserted into the slot are powered up in an orderly fashion. Operations on a card removed from the slot are halted in an orderly fashion. A current transaction on the bus is halted in an orderly fashion when a card is inserted into or removed from the slot. A conventional slot may be used.

Other advantages and features will become apparent from the following description and from the claims.

DESCRIPTION

Figure 4A:
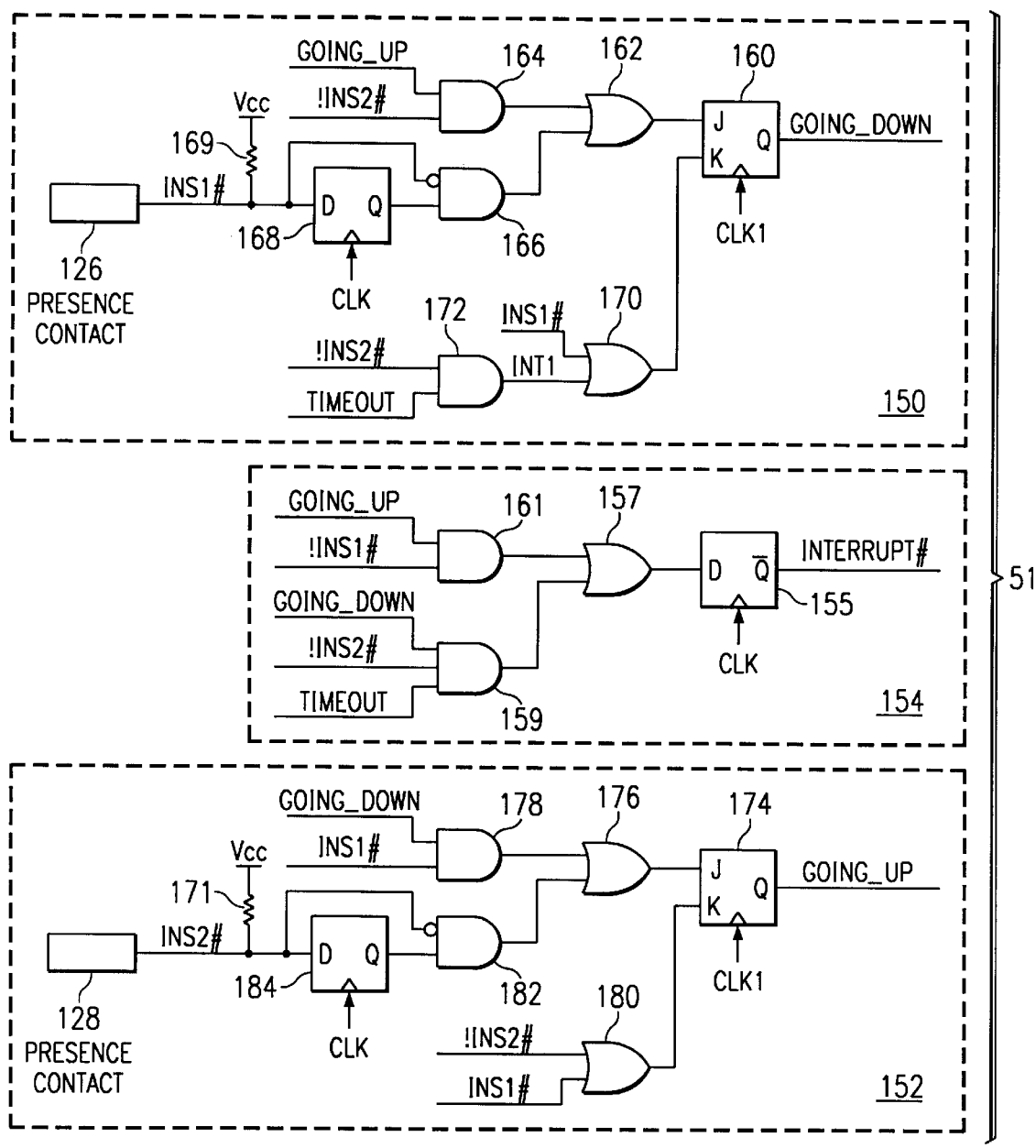
Figure 4B:
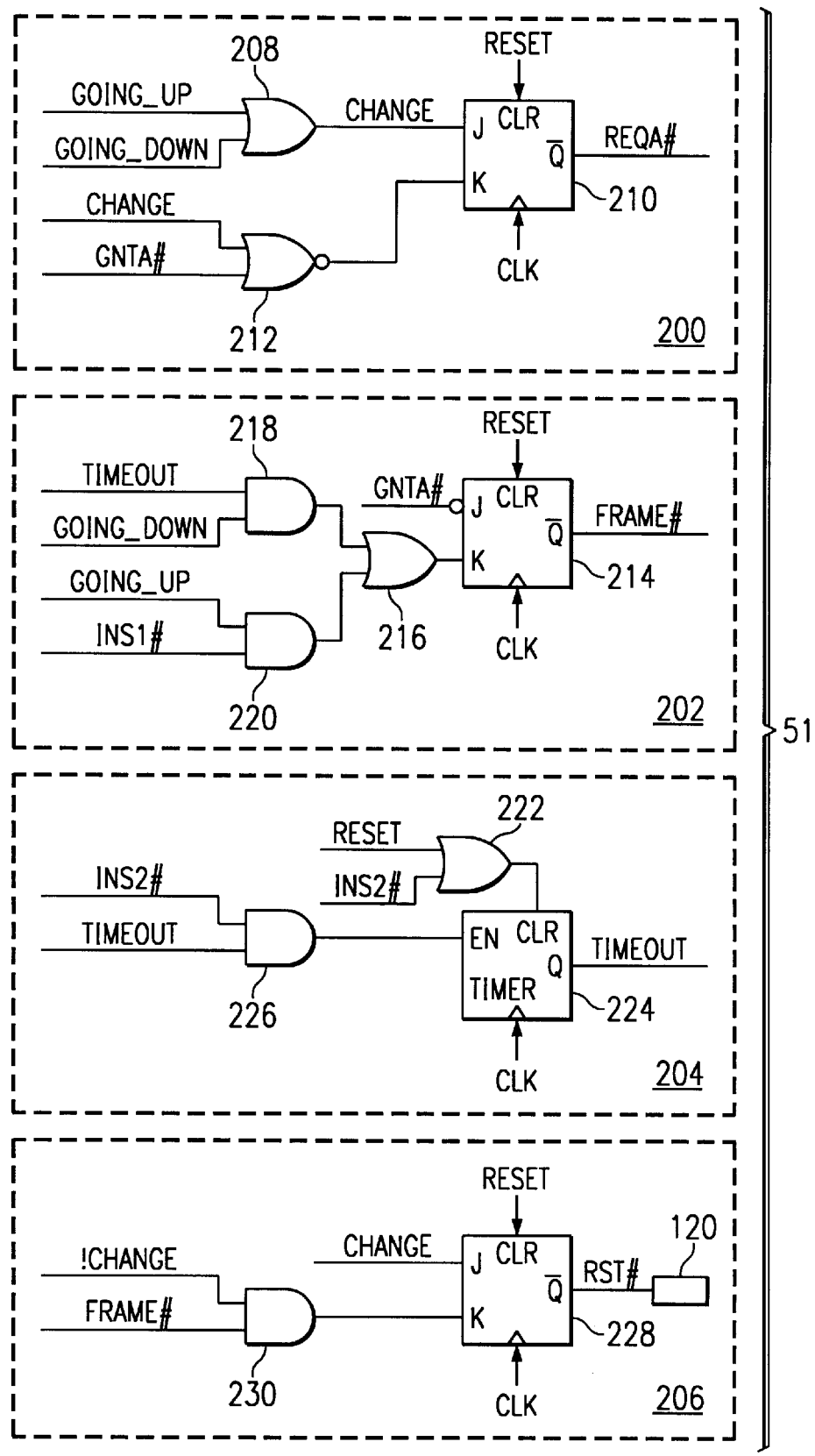

FIGS. 4A–B are schematic diagrams of expansion card circuitry.

Figure 5:
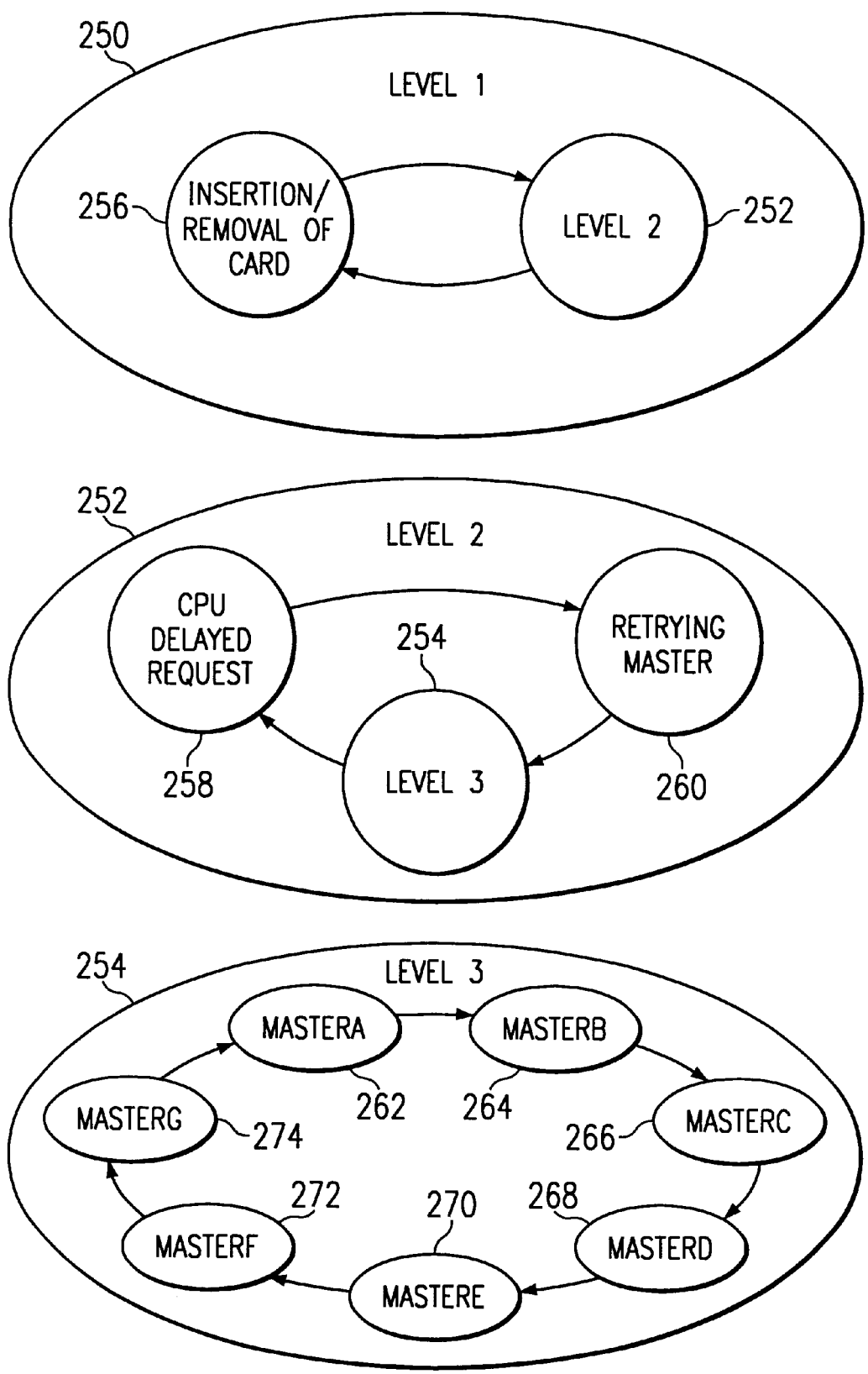

FIG. 5 is a state diagram showing a three-level arbitration scheme.

Figure 8:
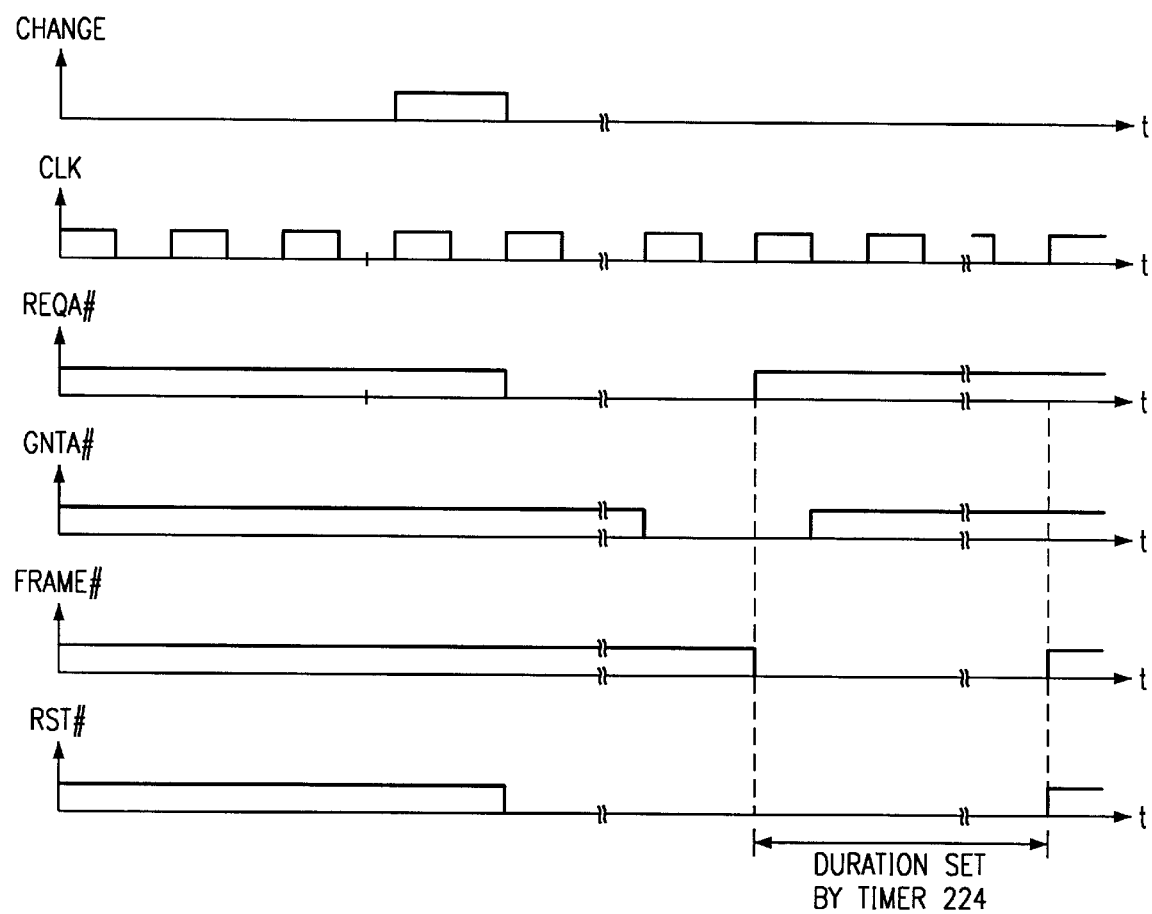

FIGS. 6–8 are waveforms from the computer system illustrating power up and power down sequences.

FIGS. 9–12 are illustrations of an expansion card being inserted into and removed from a slot.

In the following description, the suffix "#" and the prefix "!" indicate negative logic.

Figure 1:
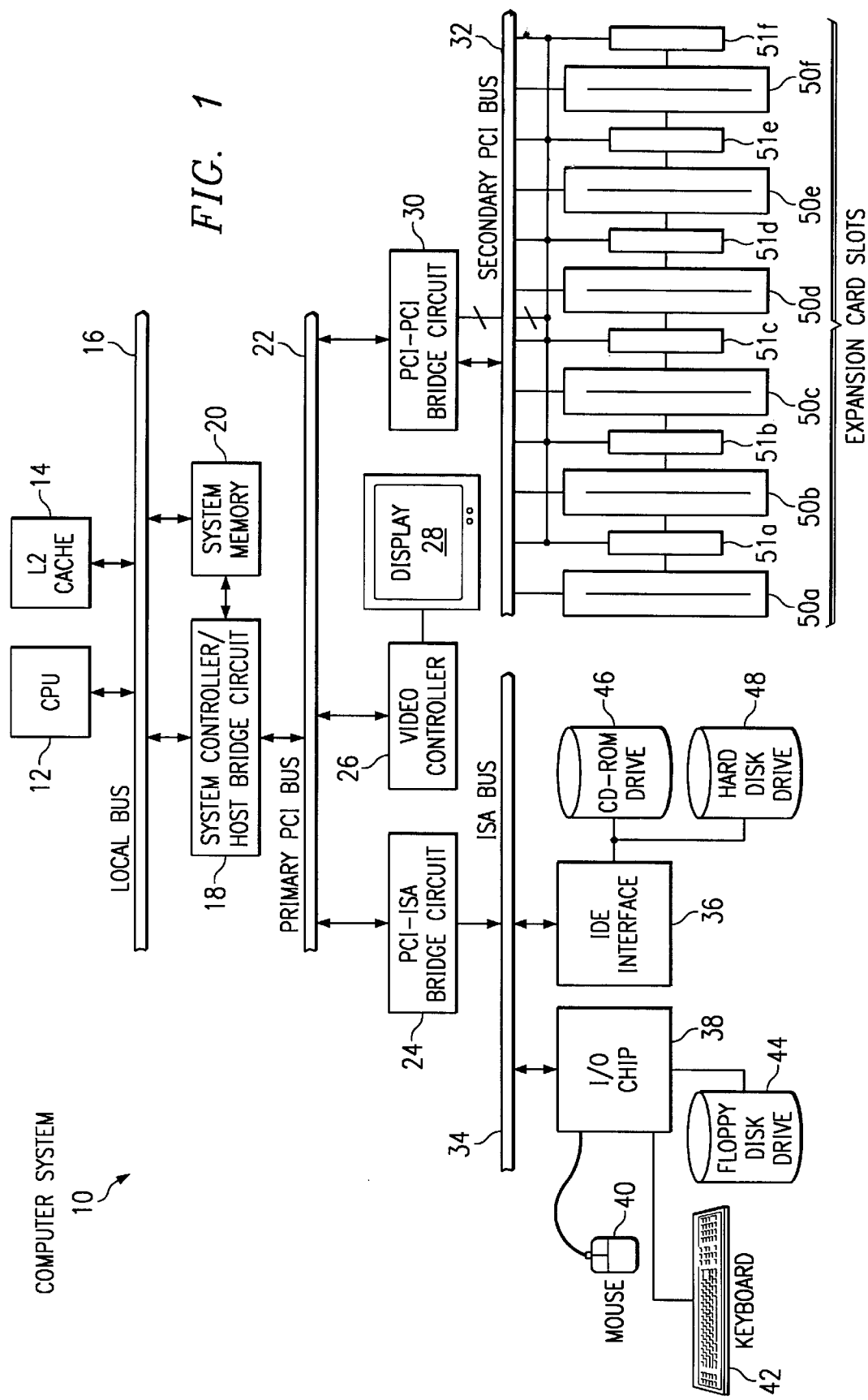
FIG. 1 is a block diagram of a computer system.
Figure 2:
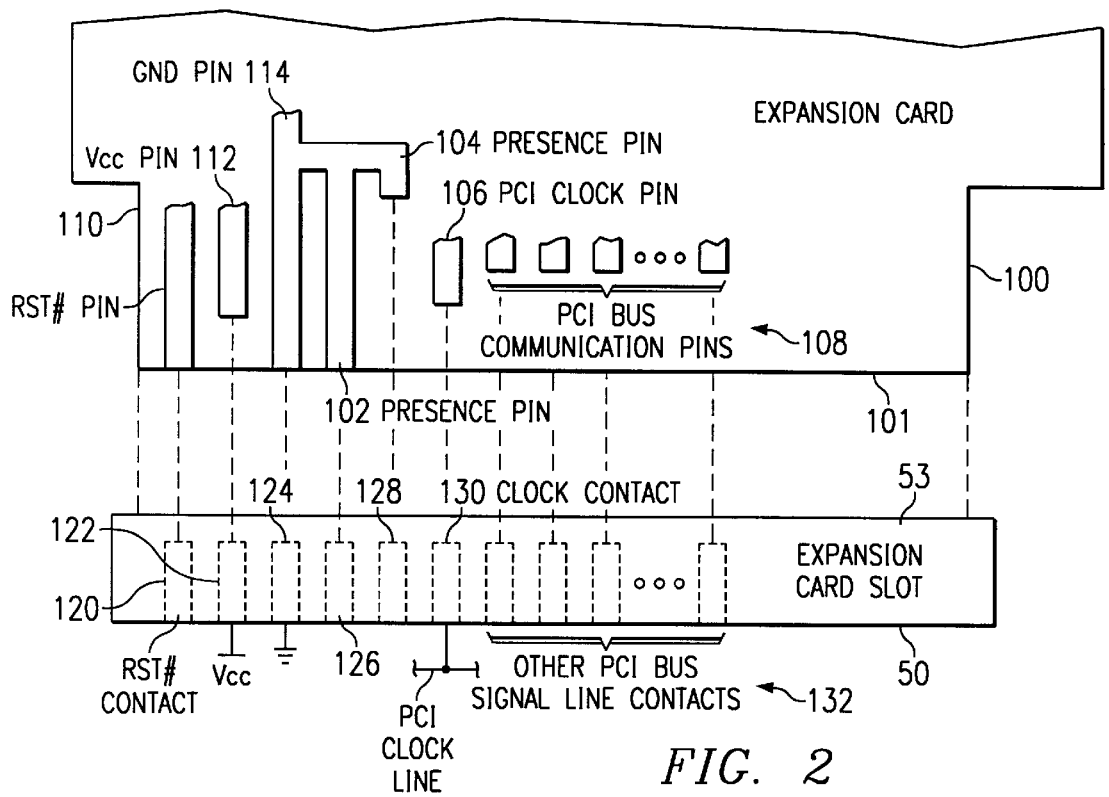
FIG. 2 is a schematic diagram of an expansion card and an expansion card slot.

As shown in FIGS. 1 and 2, a computer system 10 has six conventional expansion card slots 50a–f in which expansion cards 100 can be inserted (i.e., "hot-plugged") and removed while the computer system 10 remains powered up. Each slot 50 has spring-like contacts 120–132 for physically securing the card, 100 and for electrically connecting (via pins 102–114 of the card 100) the card 100 to a secondary Peripheral Component Interconnect (PCI) bus 32 when the card 100 is fully inserted.

For purposes of coordinating the insertion and removal of the card 100 with operations on the bus 32, monitoring circuits 51a–f (one for each of the expansion card slots 50a–f), of design 51, interact with a PCI–PCI bridge circuit 30 to request control of (i.e., arbitrate for) the secondary PCI bus 32 when one of the monitoring circuits 51a–f senses insertion or removal of the expansion card 100 into or from its slot 50. Because of the relatively long time (e.g., tenths of a second as compared to microseconds) required for someone to insert or remove the card 100, before PCI communication pins 108 of the card 100 are electrically disconnected from (upon removal of the card 100) or connected to (upon insertion of the card 100) corresponding communication lines (e.g., address/data lines) of the PCI bus 32, the bridge circuit 30 grants control of the PCI bus 32 to the monitoring circuit 51, thereby excluding other bus masters from using the bus 32. Therefore, when electrical connections are being made or broken, resultant glitches on the PCI bus 32 do not disturb operations of other bus devices connected to the bus 32 (e.g., other cards 100 that are inserted and powered up).

The cards 100 are powered up through a power up sequence and powered down through a power down sequence. Portions of the power up sequence (card 100 is inserted) and the power down sequence (card 100 is removed) are governed by the relative lengths of the pins 102–114 of the card 100 and the movement of the pins 102–114 within the slot 50 during insertion and removal, as described below.

As shown in FIG. 7, in the power down sequence, the card 100 being removed is first placed in reset (at time $T_1$) by asserting a reset pin 110 of the card 100. Next, the PCI bus communication signals (e.g., the signals from the address/data lines of the bus 32) are disconnected (at time $T_2$) from the card 100. The PCI clock signal is subsequently disconnected (at time $T_3$) from a PCI clock pin 106 of the card 100 before power from the card 100 is removed at time $T_4$. The power down sequence reduces the propagation of false signals from the card 100 being removed to the bus 32 because circuitry on the card 100 remains functional (due to the connection of power and the clock signal to the card 100) until the PCI bus communication signals are removed.

As shown in FIG. 6, in the power up sequence, the card 100 is first configured to be in reset when power is supplied (at time $T_1$). Thereafter, a PCI clock signal (from the PCI bus 32) is furnished (at time $T_2$) to the card 100 being inserted. Remaining PCI bus communication signals of the card 100 are then coupled (at time $T_3$) to corresponding lines of the PCI bus 32. The card 100 being inserted is brought out of reset (at time $T_4$). Lastly, the monitoring circuit 51 and the PCI—PCI bridge circuit 30 interact to release control of the secondary PCI bus 32 and allow other bus masters to carry out transactions on the bus 32.

In addition to the PCI—PCI bridge circuit 30, the computer system 10 includes a central processing unit (CPU) 12, a level two (L2) cache 14, and a system memory 20, all of which are coupled to a local bus 16. A system controller/host bridge circuit 18 interfaces the local bus 16 to a primary PCI bus 22 and furnishes an interface to the system memory 20. The PCI—PCI bridge circuit 30, a video controller 26, and a PCI-Industry Standard Architecture (PCI-ISA) bridge circuit 24 are all coupled to the primary PCI bus 22. The video controller 26 interfaces the PCI bus 22 to a display 28, and the bridge circuit 24 interfaces the PCI bus 22 to an ISA bus 34. An Intelligent Drive Electronics (IDE) interface 36 and an input/output (I/O) chip 38 are both coupled to the ISA bus 34. The IDE interface 36 controls operation of a CD-ROM drive 46 and a hard disk drive 48. The I/O chip 38 receives input data from a mouse 40 and a keyboard 42. The I/O chip 38 also controls operation of a floppy disk drive 44.

As shown in FIG. 2, for purposes of establishing the connection/disconnection order in the power up and power down sequences, the expansion card 100 takes advantage of the fact that the receiving ends of the contacts 120–132 are equidistant from an opening 53 of the slot 50 that receives the card 100. Therefore, as the card 100 is inserted into the slot 50 (assuming the card 100 is inserted with the bottom edge 101 generally parallel to the top edge of the slot 50), a portion of the power up sequence is established by the relative lengths of the pins of the card 100, as the longer pins make contact first. Similarly, as the card 100 is removed from the slot 100 (which establishes a portion of the power down sequence), the shorter pins of the card 100 break electrical contact with the contacts 120–132 first.

In order to reset the card 100 during the power up and power down sequences, the reset pin 110 of the card 100 (corresponding to the contact 120) extends as far as any of the other pins 102–114 toward the bottom 101 of the card 100. For purposes of establishing a common ground for the power up and power down sequences, a ground pin 114 of the card 100 (corresponding to the contact 124) extends as far down as the reset pin 110. The voltage supply pin 112 of the card 100 (corresponding to the contact 122) extends toward the bottom 101 of the card 100 but does not extend as far as the reset pin 110. The PCI clock pin 106 (corresponding to the contact 130) extends toward the bottom 101 of the card 100 but does not extend as far as the voltage supply pin 112. The PCI bus communication pins 108 (corresponding to contacts 132) extend toward the bottom 101 of the card 100 but do not extend as far as the clock pin 106. The pins 102–114 and corresponding contacts 120-132 are shown aligned side-by-side for illustrative purposes.

For purposes of requesting control of the bus 32 and placing the card 100 in reset before the beginning of the power up and power down sequences, the monitoring circuit 51 senses partial insertion of the card 100 into the slot 50 and partial removal of the card 100 from the slot 50. For purposes of sensing partial insertion of the card 100 into the slot 50, a presence sensing pin 102 (corresponding to the contact 126) extends toward the bottom 101 of the card 100 and is of the same length as the ground pin 114. The presence sensing pin 102 is electrically connected to the ground pin 114, and when the expansion card 100 is first inserted into the expansion card slot 50, the ground pin 114 of the expansion card 100 contacts the corresponding ground pin contact 124 of the expansion card slot 50 (which is coupled to ground of the computer system 10). Because the presence sensing pin 102 is of the same length of the ground pin 104 and electrically connected to the ground pin 104, the presence sensing pin 102 is connected to ground when the expansion card slot 100 is partially inserted into the card slot 50. Thus, the grounding of the presence sensing pin 102 indicates (by the transition of the voltage level of the pin 102) when the card 100 is first inserted into the slot 50 and indicates when the card 100 has entirely left the slot 50.

Similarly, for purposes of detecting when the expansion card 100 has been partially removed from the slot 50, the ground pin 114 is also electrically connected to a presence sensing pin 104 which is shorter than the PCI communication pins 108. Therefore, the disconnection of the presence sensing pin 104 from ground indicates (by the transition of the voltage level of the pin 104) the initial removal of the card 100 and indicates when the card 100 is fully inserted.

Figure 9:
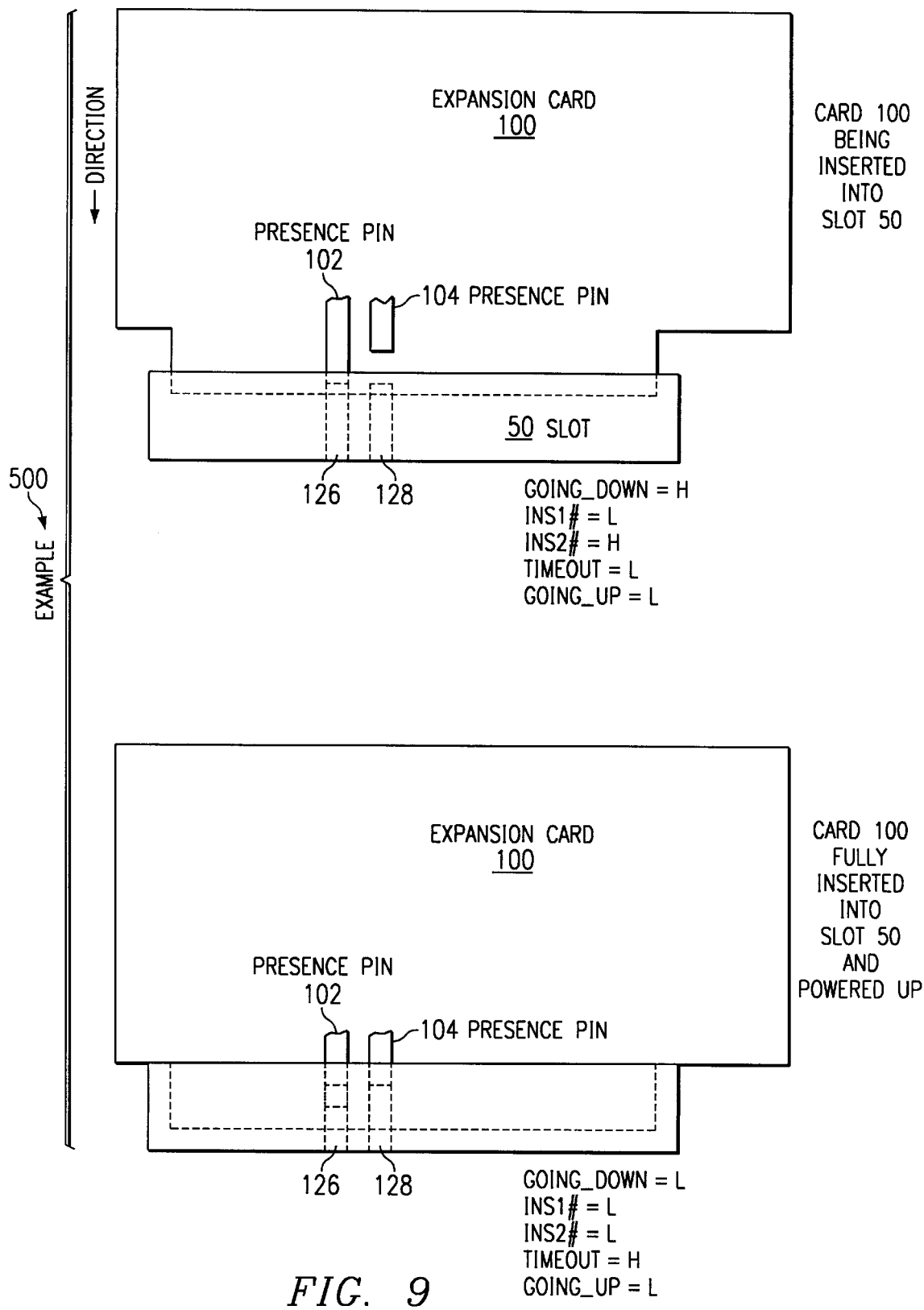
Figure 10:
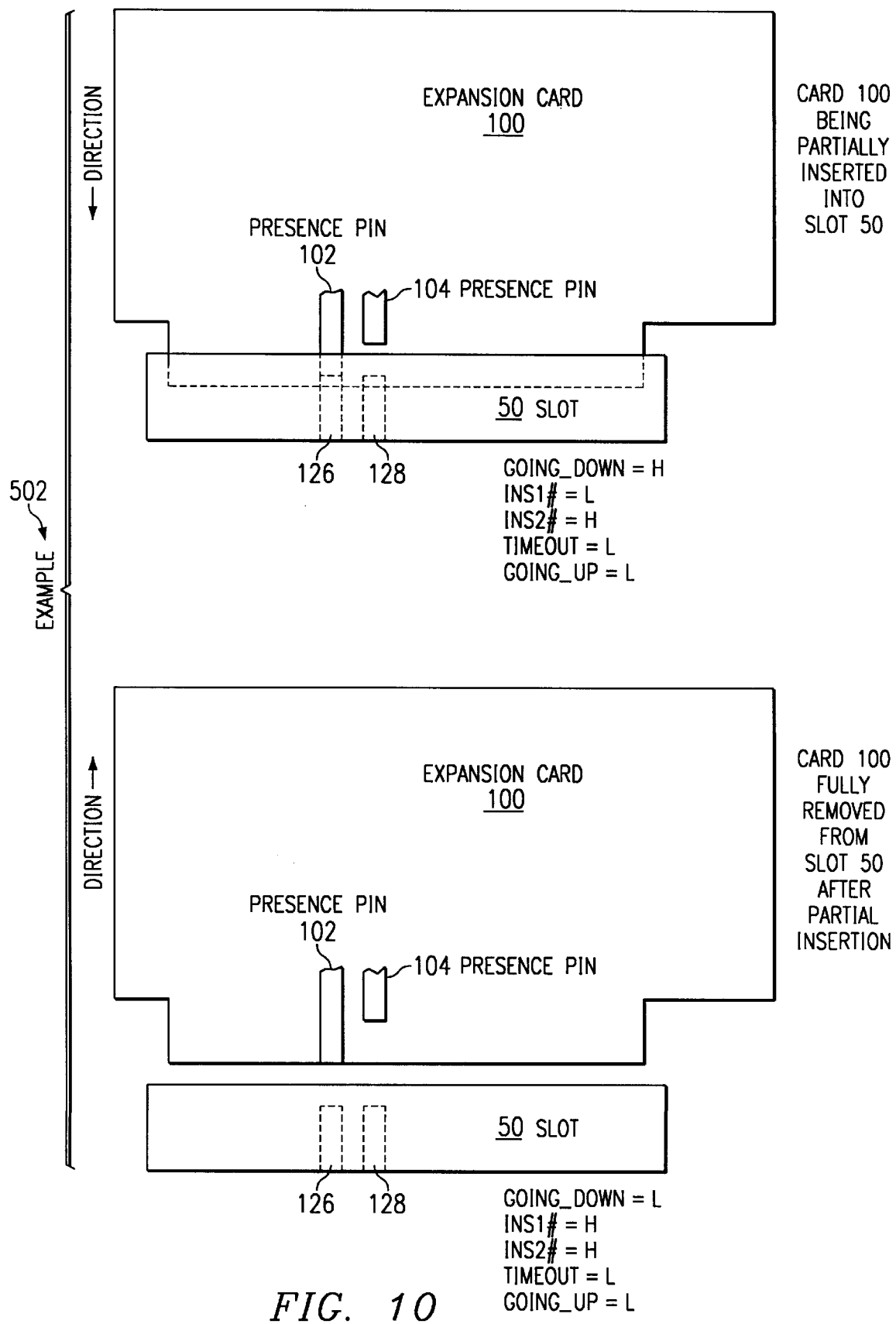

Partial insertion of the card 100 into the slot 50 may indicate someone has initiated insertion of the card 100 into the slot 50. However, partial insertion may alternatively indicate insertion of the card 100 has been aborted. The monitoring circuit 51 detects both scenarios. As shown in FIG. 9, in one example 500, the slot 50 is initially empty, and the card 100 is then partially inserted into the slot 50 (as indicated by the grounding of the presence sensing pin 102). The card 100 is then fully inserted into the slot 50 (as indicated by the grounding of the presence sensing pin 104) and powered up. However, in another example 502 (FIG. 10), instead of fully inserting the card 100 into the slot 50, the card 100 is subsequently removed from the slot 50 after partial insertion (as indicated by the disconnecting of ground from the presence sensing pin 102).

Figure 11:
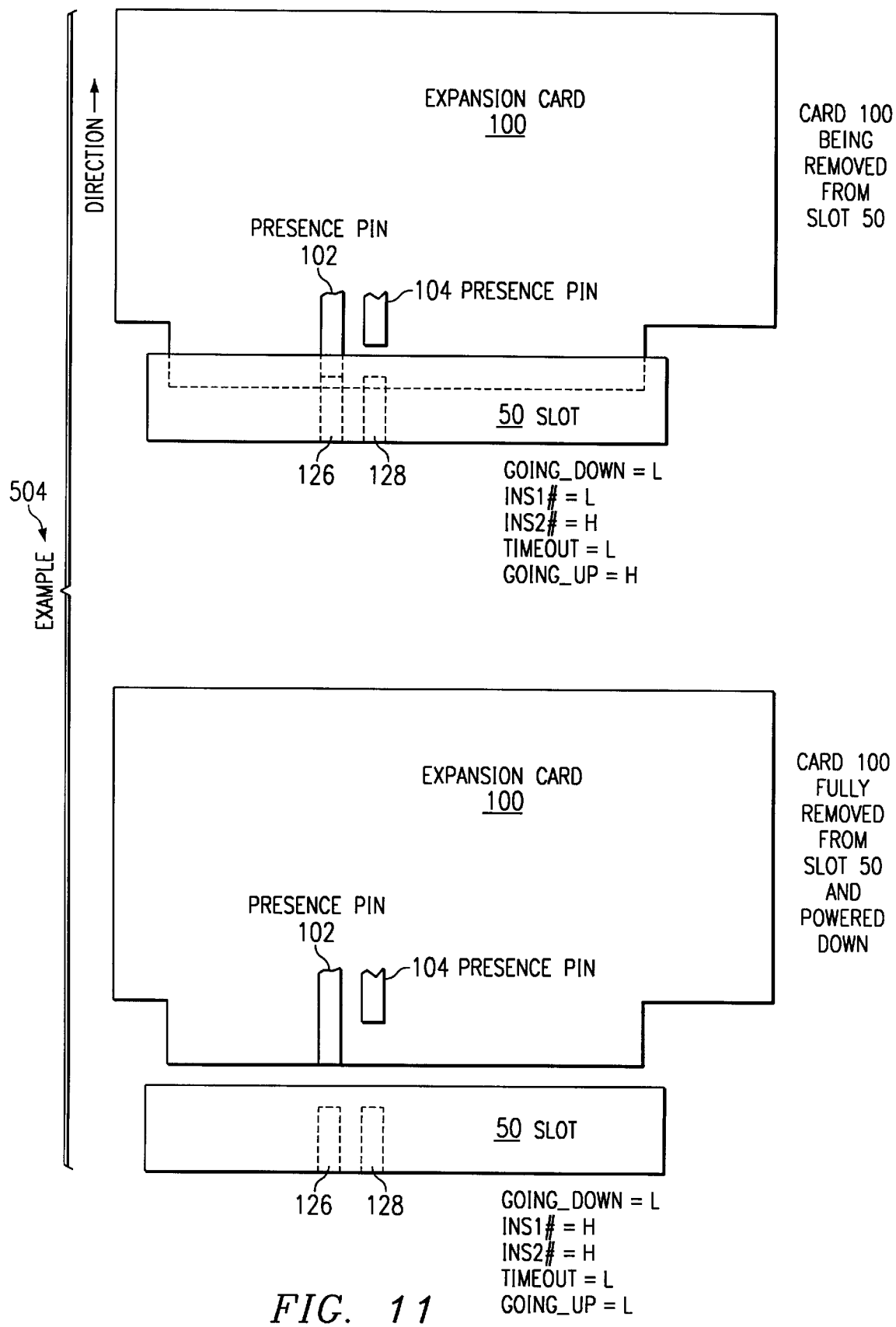
Figure 12:
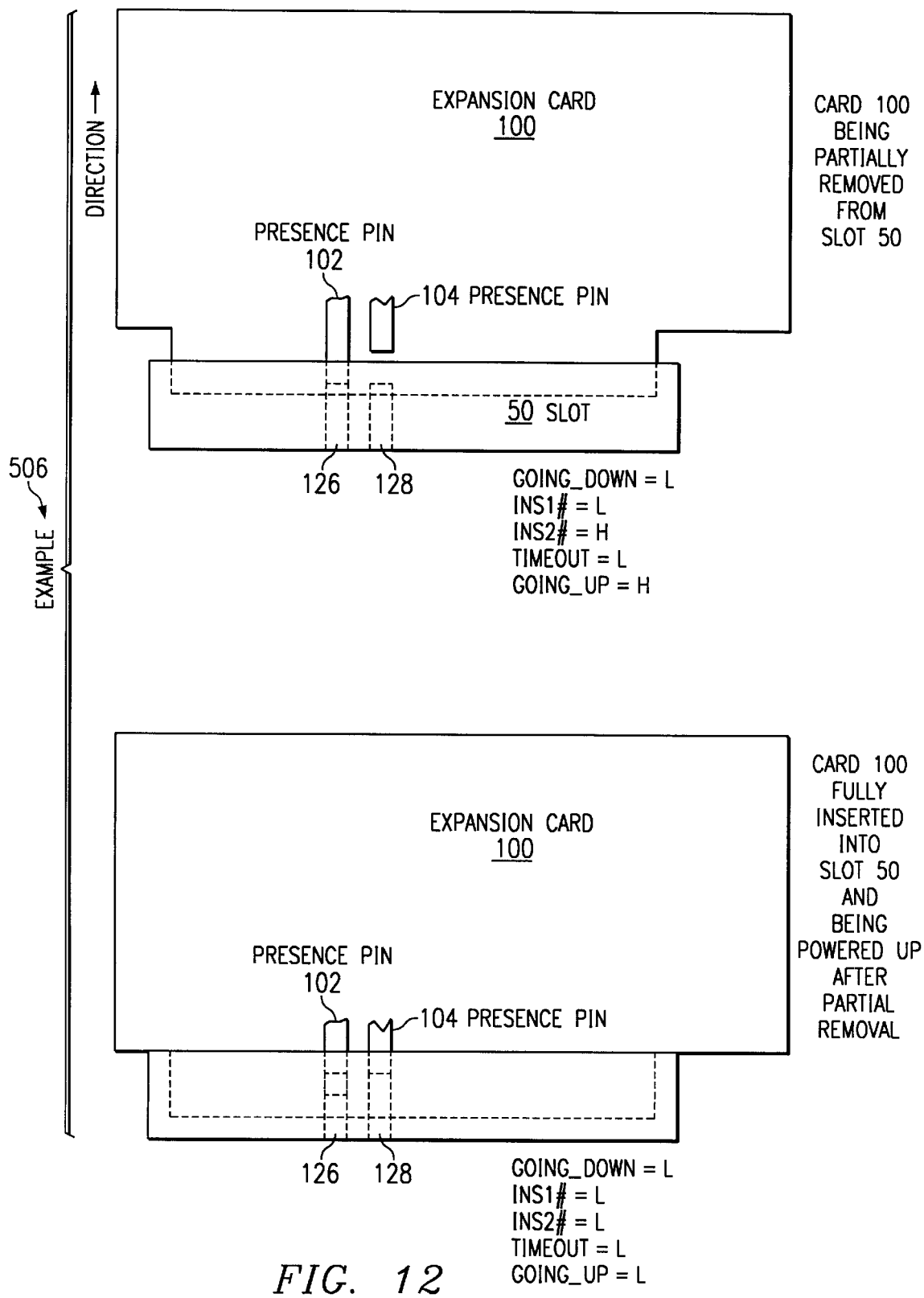

Similarly, besides recognizing when someone has initiated a removal of the card 100 from the slot 50, the monitoring circuit 51 also detects when a removal of the card 100 has been aborted. As shown in FIG. 11, in one example 504, a fully inserted card 50 is partially removed (as indicated by the disconnecting of ground from the presence sensing pin 104). The card 100 is then fully removed from the slot 50 as indicated by the disconnecting of ground from the presence sensing pin 102 and powered down. However, instead of being fully removed from the slot 50, the card 100 may subsequently be fully inserted (FIG. 12) into the slot 50 after partial removal. The full insertion of the card 100 back into the slot 50 is indicated by the subsequent grounding of the presence sensing pin 104 after the detected partial removal of the card 100 (indicated by disconnection of ground from the presence sensing pin 102).

Figure 3:
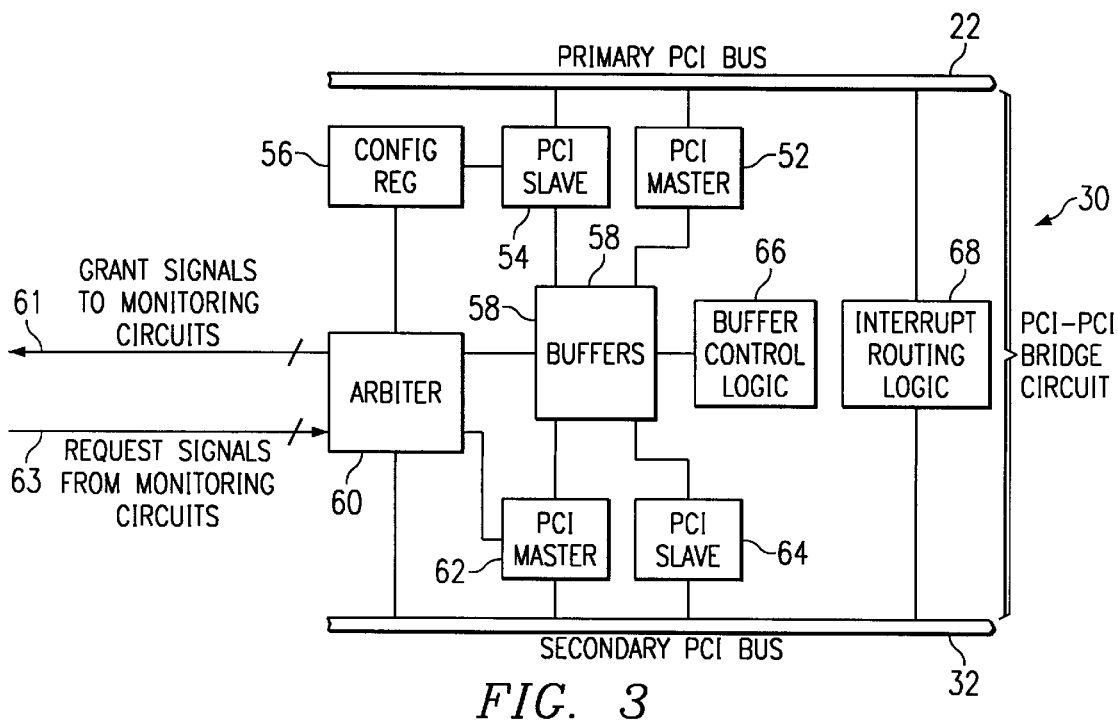
FIG. 3 is a block diagram of a bridge circuit of FIG. 1.

As shown in FIG. 3, for purposes of controlling access to the PCI bus 32, the PCI—PCI bridge circuit 30 includes an arbiter 60. The arbiter 60 receives PCI request signals (via request lines 63 separate from request lines of the bus 32) from the monitoring circuits 51*a–f* and furnishes corresponding grant signals (via grant lines 61 separate from grant lines of the bus 32) to the monitoring circuits 51*a–f*. Although the arbiter 60 has a programmable grant timer (programmed via configuration registers 56) to govern the maximum duration a bus master may hold the bus 32, the arbiter 60 allows the monitoring circuit 51 to hold access to the bus 32 until the monitoring circuit 51 releases the bus (at the completion of the power up or power down sequence), as described below.

As shown in FIG. 5, the arbiter 60 has three levels 250, 252, and 254 of arbitration. In the first level 250 (the highest priority level), the arbiter 60 arbitrates in a round-robin fashion between a request from the second level 252 (the level with the second highest priority) and a request 256 from one of the monitoring circuits 51*a–f*. For the second level 252, the arbiter 60 arbitrates in a round-robin fashion between requests 260 from a retrying master on the bus 32, a third level request 254 (lowest priority level), and a CPU 10 delayed request 258. For the third level 254, the arbiter 60 arbitrates in a round-robin fashion between requesting masters 262–274 on the bus 32. Therefore, at most, only one transaction is performed when either the card 100 is first partially inserted or removed, and after the one transaction, the arbiter 60 grants control to the monitoring circuit 51 requesting the bus 32.

For transactions on the primary PCI bus 22, the bridge circuit 30 includes a PCI slave 54 and a PCI master 52, both of which are coupled to the primary PCI bus 22. For transactions on the secondary PCI bus 32, the bridge circuit 30 includes a PCI master 62 and a PCI slave 64, both of which are coupled to the secondary PCI bus 32. Buffers 58 interact with buffer control logic 66 to control the flow of transactions between the buses 22 and 32 and preserve the PCI transactional ordering rules. Interrupt routing logic 68 directs the flow of interrupt requests from the bus 32 to the bus 22.

For purposes of indicating to the CPU 10 when the card 100 has been partially inserted or removed, the monitoring circuit 51 furnishes an interrupt request signal INTERRUPT# which is asserted, or driven low, to indicate a detected insertion or removal and deasserted, or driven high, otherwise. As shown in FIG. 4A, in order to furnish the signal INTERRUPT#, the monitoring circuit 51 includes an interrupt circuit 154. The signal INTERRUPT# is furnished by the inverting output of a D-type flip-flop 155 which is clocked on the positive edge of a PCI clock signal CLK (from the bus 32). The input of the flip-flop 155 is connected to the output of an OR gate 157 which has one input connected to the output of an AND gate 161. The AND gate 161 receives a signal !INS1# and a signal GOING_UP. The signal GOING_UP is asserted, or driven high, to indicate when the card 100 is being removed from the Blot 50. The signal INS1# is indicative of the voltage level of the contact 126 (corresponding to the pin 102). Therefore, when the card 100 is removed from the slot 50, the signal INTERRUPT# is asserted.

Another input of the OR gate 157 is connected to the output of an AND GATE 159. The AND gate 159 receives a signal GOING_DOWN that is asserted, or driven high, to indicate when the card 100 is being inserted into the slot 50. The AND gate 159 also receives a signal !INS2# and a signal TIMEOUT. The signal INS2# is indicative of the voltage level of the contact 128 (corresponding to the pin 104). The signal TIMEOUT is asserted, or driven high, to indicate when the card 100 has powered up and stabilized. Therefore, when the card 100 is inserted into the slot 50 and powered up, the signal INTERRUPT# is asserted. The signals GOING_UP and GOING_DOWN are otherwise deasserted, or driven low.

For purposes of generating the signal GOING_DOWN, the monitoring circuit 51 includes a circuit 150. The signal GOING_DOWN is furnished by the output of a J-K flip-flop 160 which is clocked on the positive edge of the signal CLK. The J input of the flip-flop 160 is connected to the output of an OR gate 162. One input of the OR gate 162 is connected to the output of an AND gate 164. The AND gate 164 receives the signal GOING_UP and the signal !INS2#. The voltage level of the contact 128 is pulled high (when deasserted) via a pull-up resistor 171. Therefore, if the card 100 is being removed but is subsequently fully inserted back into the slot 50 (i.e., Example 506), the signal GOING_DOWN is asserted.

The other input of the OR gate 162 is connected to the output of an AND gate 166. One input of the AND gate 166 is connected to the non-inverting output of a D-type flip-flop 168. An inverting input of the AND gate 166 is connected to the signal input of the flip-flop 168. The flip-flop 168 is clocked on the positive edge of the signal CLK. The input of the flip-flop 168 receives the signal INS1#. The voltage level of the contact 126 is pulled high (when deasserted) via a pull-up resistor 169. Therefore, when the card 100 is fully removed and then partially inserted (i.e., Example 500), the signal GOING_DOWN is asserted.

The K input of the flip-flop 160 is connected to the output of an OR gate 170. One input of the OR gate 170 receives the signal INS1#. Therefore, when the card 100 leaves the slot 50 entirely, the signal GOING_DOWN is deasserted. The other input of the OR gate 170 is connected to the output of an AND gate 172. The AND gate 172 receives the signal !INS2# at one input and a timeout signal TIMEOUT (described below) at another input.

For purposes of allowing operations on the card 100 to stabilize after full insertion into the slot 50, the monitoring circuit 51 delays for a predetermined duration (e.g., looms) before releasing control of the bus 32. The signal TIMEOUT is internally generated by the monitoring circuit 51 and asserted, or driven high, to indicate expiration of the predetermined duration and deasserted, or driven low, otherwise. Thus, when the card 100 is fully inserted and the predetermined duration expires (i.e., Example 500), the signal GOING_DOWN is deasserted.

For purposes of furnishing the signal GOING_UP, the monitoring circuit 51 includes a circuit 152. The circuit 152 includes a J-K flip-flop 174 which furnishes the signal GOING_UP at its non-inverting output. The flip-flop 174 is clocked on the positive edge of the signal CLK. The J input of the flip-flop 174 is connected to the output of an OR gate 176. One input of the OR gate 176 is connected to the output of an AND gate 178 which receives the signals GOING_DOWN and INS1#. Therefore, the signal GOING_UP is asserted when partial insertion of the card 100 has been detected, but the card 100 is subsequently removed from the slot 50 (i.e., Example 502).

The other input of the OR gate 176 is connected to the output of an AND gate 182. One input of the AND gate 182 is connected to the non-inverting output of a D-type flip-flop 184, and an inverting input of the AND gate 182 is connected to the input of the flip-flop 184 which receives the signal INS2#. The flip-flop 184 is clocked on the positive edge of the CLK signal. Therefore, the signal GOING_UP is asserted when partial removal of the card 100 is detected.

The K input of the flip-flop 174 is connected to the output of OR gate 180 which receives the signal !INS2# and the signal INS1#. Therefore, the signal GOING_UP is deasserted when either the card 100 is fully inserted (i.e., Example 500) or when the card 100 has been completely removed.

As shown in FIGS. 4B and 8, for purposes of requesting the bus 32 (via one of the request lines 63), the monitoring circuit 51 furnishes a signal REQA#. The signal REQA# is asserted, or driven low, to request the bus 32 and deasserted, or driven high, otherwise. For purposes of furnishing the signal, the monitoring circuit 51 includes a circuit 200. The circuit 200 includes a J-K flip-flop 210 which furnishes the REQA# signal at its inverting output.

The flip-flop 210 is clocked on the positive edge of the signal CLK. The J input of the flip-flop 210 receives a CHANGE signal (asserted, or driven high, for one cycle of the signal CLK to indicate movement of the card 100 and deasserted, or driven low, otherwise), and the K input of the flip-flop 210 is connected to the output of a NOR gate 212. The CHANGE signal is furnished by output of an OR gate 208 which receives the signals GOING_UP and GOING_DOWN. The NOR gate 212 receives the CHANGE signal and the grant signal (GNTA#) from the arbiter 60.

For purposes of indicating to the arbiter 60 that the monitoring circuit 51 is holding the bus 32 (once granted), the monitoring circuit 51 asserts, or drives high, a PCI frame signal (FRAME#) on the PCI bus 32. For purposes of asserting the signal FRAME#, the monitoring circuit 51 includes a circuit 202. The circuit 202 includes a J-K flip-flop 214 which furnishes the FRAME# signal at its tristated, inverting output. The flip-flop 214 is clocked on the positive edge of the signal CLK and receives a PCI bus grant signal GNTA# at its inverting J input. The signal GNTA# is asserted, or driven high (via the grant lines 61) by the arbiter 60 to indicate granting of the bus 32 to the monitoring circuit 51. The signal GNTA# is otherwise deasserted, or driven low. The K input of the flip-flop 214 is connected to the output of a OR gate 216. One input of the OR gate 216 is connected to the output of an AND gate 218 which receives the signals TIMEOUT and GOING_DOWN. The other input of the OR gate 216 is connected to the output of an AND gate 220 which receives the signals GOING_UP and INS1#.

For purposes of generating the signal TIMEOUT, the monitoring circuit 51 includes a circuit 204. The circuit 204 includes a timer 224 which furnishes the signal TIMEOUT at its output. The enable input of the timer 224 is connected to the output of an AND gate 226 which receives the signals !INS2# and !TIMEOUT. The timer 224 is clocked on the positive edge of the signal CLK. The clear input of the timer 224 is connected to the output of an OR gate 222 which receives a PCI reset signal RESET and the signal INS2#. Therefore, when the card 100 is fully inserted into the slot 50, the timer 224 begins measuring the predetermined duration (as indicated by the signal TIMEOUT).

For purposes of resetting the card 100 during the power up and power down sequences, the monitoring circuit 51 furnishes a signal RST# to the reset contact 120 (corresponding to the reset pin 110). The signal RST# is asserted, or driven low, to reset the card 100 and deasserted, or driven high, otherwise. The monitoring circuit 51 includes a circuit 206 to generate the signal RST#. The circuit 206 includes a J-K flip-flop 228 which furnishes the signal RST# at its inverting output. The flip-flop 228 is clocked on the positive edge of the signal CLK, and the J input of the flip-flop 228 receives the signal CHANGE. The K input of the flip-flop 228 is connected to the output of an AND gate 230 which receives the signals !CHANGE and FRAME#. Therefore, when the insertion or removal of the card 100 is first detected, the card 100 is placed in reset until the monitoring circuit 51 releases the bus 32 (i.e., either after power up of the card 100 or after complete removal of the card 100 from the slot 50).

Other embodiments are within the scope of the following claims. For example, instead of arbitrating for the bus 32, the monitoring circuit 51 may halt operations of the CPU 50 (by asserting a stop clock pin of the CPU 50) when the monitoring circuit 51 detects partial insertion or partial removal of the card. In another example, the monitoring circuits 51a–f may use the request and grant lines of the PCI bus 32 instead of the lines 61 and 63. In other examples, the ISA bus 34, the primary PCI bus 22, or an EISA bus may be substituted for the secondary PCI bus 32.

What is claimed is:

1. A computer system comprising:

a bus;

a card slot coupled to the bus;

a monitoring circuit coupled to the card slot and configured to determine the status of a card within the slot, the monitoring circuit generating a first signal from a first time when the card is introduced to the slot to a second time when the card is fully inserted in the slot, the monitor circuit also generating a second signal from a third time when the card begins to be removed from the slot until a fourth time when the card is fully removed from the slot; and an arbiter coupled to the monitoring circuit to receive requests for access to the bus and selectively grant access to the bus.

2. The system of claim 1 wherein the arbiter requests access to the bus by asserting a signal at the first time and holding the signal asserted until either the card is removed from the slot or the bus is granted.

3. The system of claim 2 wherein the arbiter requests access to the bus by asserting a signal at the third time and holding the signal asserted until either the card is reinserted from the slot or the bus is granted.

4. The system of claim 1 and further comprising a card inserted in the slot.

5. The system of claim 1 and further comprising a processor coupled to the slot via the bus.

6. A computer system comprising:

a CPU;

system memory coupled to the CPU;

a controller/bridge circuit coupled to the CPU;

a bus coupled to the controller/bridge circuit;

an chip coupled to the CPU;

an input device coupled to the I/O chip;

a disk drive coupled to the CPU;

a card slot coupled to the bus;

a monitoring circuit coupled to the card slot and configured to determine the status of a card within the slot, the monitoring circuit generating a first signal from a first time when the card is introduced to the slot to a second time when the card is fully inserted in the slot, the monitor circuit also generating a second signal from a third time when the card begins to be removed from the slot until a fourth time when the card is fully removed from the slot; and an arbiter coupled to the monitoring circuit to receive requests for access to the bus and selectively grant access to the bus.

7. The system of claim 6 wherein the controller/bridge circuit is coupled between the CPU and a first bus.

8. The system of claim 7 and further comprising a second bridge circuit coupled between the first bus and the bus.

9. The system of claim 8 wherein the first bus comprises a primary PCI bus and the second bus comprises a secondary PCI bus.

* * * * *